(12) United States Patent
Palatini et al.

(10) Patent No.: US 11,454,533 B2
(45) Date of Patent: Sep. 27, 2022

(54) METHOD FOR STARTING UP A FIELD DEVICE IN A SIMPLIFIED MANNER

(71) Applicant: Endress+Hauser SE+Co. KG, Maulburg (DE)

(72) Inventors: Florian Palatini, Kleines Wiesental (DE); Eric Birgel, Schopfheim (DE); Tanja Haag, Schopfheim (DE)

(73) Assignee: ENDRESS+HAUSER SE+CO. KG, Maulburg (DE)

( * ) Notice: Subject to any disclaimer, the term of this patent is extended or adjusted under 35 U.S.C. 154(b) by 221 days.

(21) Appl. No.: 16/954,177

(22) PCT Filed: Nov. 14, 2018

(86) PCT No.: PCT/EP2018/081150
§ 371 (c)(1),
(2) Date: Jun. 16, 2020

(87) PCT Pub. No.: WO2019/115117
PCT Pub. Date: Jun. 20, 2019

(65) Prior Publication Data
US 2020/0319013 A1 Oct. 8, 2020

(30) Foreign Application Priority Data

Dec. 15, 2017 (DE) ...................... 10 2017 130 138.0

(51) Int. Cl.
*G01F 25/20* (2022.01)
*G06T 7/62* (2017.01)
(Continued)

(52) U.S. Cl.
CPC .............. *G01F 25/20* (2022.01); *G01F 23/28* (2013.01); *G01F 23/80* (2022.01); *G01S 15/10* (2013.01);
(Continued)

(58) Field of Classification Search
CPC .......... G01F 25/20; G01F 23/80; G01F 23/28; G06T 7/62; G06T 17/00; G06T 19/006;
(Continued)

(56) References Cited

U.S. PATENT DOCUMENTS

2011/0249000 A1* 10/2011 Isenmann .......... G05B 19/4185
345/428
2012/0221261 A1  8/2012 Fehrenbach et al.
(Continued)

FOREIGN PATENT DOCUMENTS

CN   104375473 A   2/2015
CN   105551409 A   5/2016
(Continued)

*Primary Examiner* — Aditya S Bhat
(74) *Attorney, Agent, or Firm* — Mark A. Logan; Endress+Hauser (USA) Holding Inc.

(57) ABSTRACT

Disclosed is a method for starting-up by means of a service unit a field device of automation technology mounted on a component, especially a container, at a measuring location, wherein the service unit has a display unit and a camera, comprising: identifying the field device by means of the service unit; based on the identifying of the field device, ascertaining parameters of the field device to be set; registering geometry data of at least a part of the component by means of the camera; analyzing the registered geometry and, by means of the analyzing of the registered geometry, deriving at least one parameter value for at least one of the parameters to be set; confirming the calculated parameter value; and transferring the confirmed parameter value into the field device and storing the parameter value in the field device.

13 Claims, 1 Drawing Sheet

(51) Int. Cl.
*G01F 23/28* (2006.01)
*G01S 15/10* (2006.01)
*G01S 15/88* (2006.01)
*G05B 19/042* (2006.01)
*G06T 17/00* (2006.01)
*G06T 19/00* (2011.01)
*G08C 17/02* (2006.01)
*G01F 23/80* (2022.01)

(52) U.S. Cl.
CPC .......... *G01S 15/88* (2013.01); *G05B 19/0426* (2013.01); *G06T 7/62* (2017.01); *G06T 17/00* (2013.01); *G06T 19/006* (2013.01); *G08C 17/02* (2013.01); *G05B 2219/25428* (2013.01)

(58) Field of Classification Search
CPC ..... G01S 15/10; G01S 15/88; G05B 19/0426; G05B 2219/25428; G08C 17/02
USPC .......................................................... 702/55
See application file for complete search history.

(56) References Cited

U.S. PATENT DOCUMENTS

| | | | |
|---|---|---|---|
| 2016/0343124 | A1* | 11/2016 | Sundheimer ............ G01F 22/00 |
| 2017/0276536 | A1* | 9/2017 | Malinovskiy ............. G01S 7/35 |
| 2017/0284854 | A1* | 10/2017 | Skowaisa ............... G01F 23/804 |

FOREIGN PATENT DOCUMENTS

| | | |
|---|---|---|
| CN | 105980291 A | 9/2016 |
| CN | 106104224 A | 11/2016 |
| DE | 102004016329 A1 | 5/2005 |
| DE | 102012104858 A1 | 12/2013 |
| DE | 102013108490 A1 | 2/2015 |
| DE | 102016207058 A1 | 10/2017 |
| EP | 1480021 B1 | 11/2014 |
| JP | 2016003871 A | 1/2016 |
| WO | 2007066166 A1 | 6/2007 |
| WO | 2016005121 A2 | 1/2016 |

* cited by examiner

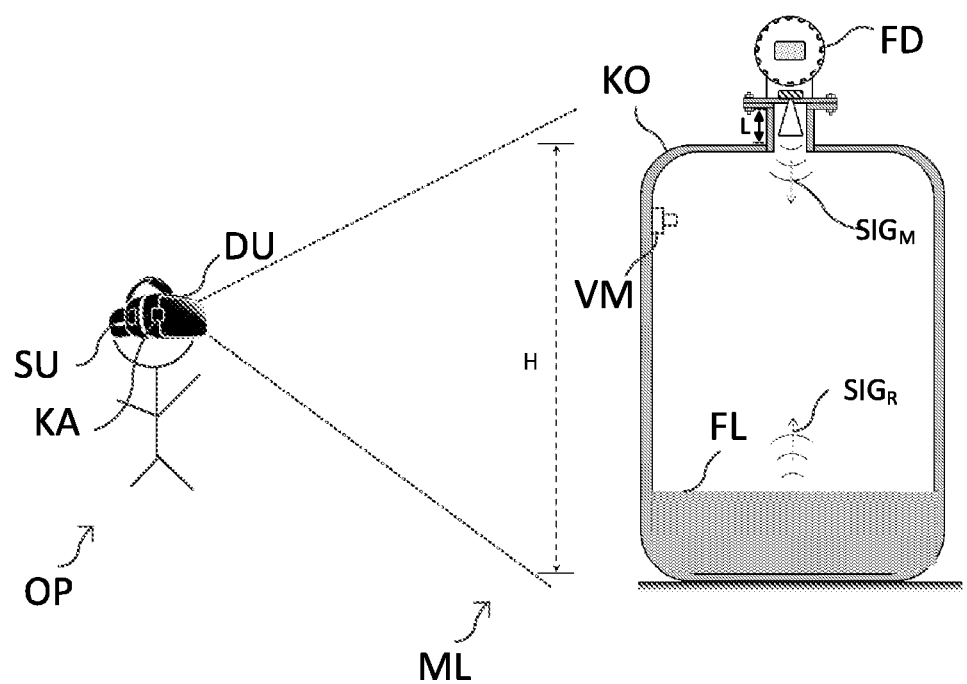

METHOD FOR STARTING UP A FIELD DEVICE IN A SIMPLIFIED MANNER

CROSS-REFERENCE TO RELATED APPLICATIONS

The present application is related to and claims the priority benefit of German Patent Application No. 10 2017 130 138.0, filed on Dec. 15, 2017 and International Patent Application No. PCT/EP2018/081150, filed on Nov. 14, 2018 the entire contents of which are incorporated herein by reference.

TECHNICAL FIELD

The invention relates to a method for starting-up by means of a service unit a field device of automation technology mounted on a component, especially a container, at a measuring location, wherein the service unit has a display unit and a camera.

BACKGROUND

Known from the state of the art are field devices, which are used in industrial plants. Field devices are often applied in automation technology, as well as in manufacturing automation. Referred to as field devices are, in principle, all devices, which are applied near to a process and which deliver, or process, process relevant information. Thus, field devices are used for registering and/or influencing process variables. Serving for registering process variables are measuring devices utilizing sensors. Such are used, for example, for pressure- and temperature measurement, conductivity measurement, flow measurement, pH measurement, fill level measurement, etc. and register the corresponding process variables, pressure, temperature, conductivity, pH value, fill level, flow, etc. Used for influencing process variables are actuators. Such are, for example, pumps or valves, which can influence the flow of a liquid in a tube or the fill level in a container. Besides the above mentioned measuring devices and actuators, referred to as field devices are also remote I/Os, radio adapters, and, in general, devices, which are arranged at the field level.

For fill level measurement of fill substances in containers, contactless measuring methods have proven themselves, since they are robust and require low-maintenance. In such case, "container" within the scope of the invention refers also to open containers, such as, for example, a vat, lake or ocean or a flowing body of water. A further advantage of contactless measuring methods is their ability to measure the fill level virtually continuously. In the field of continuous fill level measurement, consequently, primarily ultrasonic, or radar-based, measuring methods are applied (in the context of the invention, the terminology, ultrasound, refers to sound waves in a frequency range between 14 kHz and 1 GHz, while the terminology, "radar" refers to signals, or electromagnetic waves, having frequencies between 0.03 GHz and 300 GHz).

In the case of ultrasonic or radar-based fill level measurement, the pulse travel time, measuring principle is an established measuring principle. In such case, ultrasonic, or microwave pulses are transmitted as measuring signals cyclically in the direction of the fill substance and the travel time to receipt of the corresponding echo pulse measured. Based on this measuring principle, fill level measuring devices can be implemented with comparatively little circuit complexity. A radar-based, fill level measuring device, which works according to the pulse travel time method, is described, for example, in disclosure document DE 10 2012 104 858 A1. The ultrasonically based companion is described, in among others, the patent, EP 1480021 B1.

When a more complex circuit technology can be tolerated, also FMCW ("Frequency Modulated Continuous Wave") radar can be used as measuring principle for radar-based fill level measurement. An example of a typical construction of FMCW-based fill level measuring devices is shown in disclosure document DE 10 2013 108 490 A1.

The measuring principle of FMCW radar based distance measuring methods rests on transmitting a radar-based measuring signal continuously with modulated frequency. In such case, the frequency of the measuring signal lies in a fixed frequency band in the region of a standardized center frequency. Characteristic for FMCW is that the transmitted frequency is not constant, but, rather, changes periodically within a defined frequency band. The change with time is, in such case, according to standard, linear and has a sawtooth- or triangular shape. A sinusoidal change can, in principle, however, also be used. In contrast with the pulse travel time method, the distance, or the fill level, in the case of implementing the FMCW method is determined based on the instantaneous frequency difference between the currently received, reflected, measuring signal and the instantaneously transmitted, measuring signal.

In the case of each of the above mentioned measurement principles (ultrasound, pulse radar, and FMCW) for ascertaining fill level based on the received, reflected, measuring signal, a corresponding measurement curve is recorded. In the case of application of ultrasound, the measurement curve corresponds basically directly to amplitude versus time for the reflected, measuring signal. In the case of the pulse radar-based method, the measurement curve is, due to the high pulse frequency, in contrast, created by undersampling the reflected, measuring signal. In this way, the measurement curve is a time stretched version of the actual, reflected, measuring signal. In the case of implementing the FMCW method, the measurement curve is created by mixing the instantaneously transmitted, measuring signal with the reflected, measuring signal. In all cases, the measurement curve represents, however, the amplitude of the reflected, measuring signal as a function of measured distance.

A large number of such field devices are produced and sold by the Endress+Hauser group of companies.

Field devices, which are placed in a new application of a process installation, or replacement field devices, which replace an aged or defective field device of an application, must in their start-up be specifically adapted to the particular application of the field device at the measuring location. For such purpose, these field devices are configured and parametered during or after their production. The configuration describes, on the one hand, the hardware configuration, for example, the flange material of a flowmeter, as well as, on the other hand, also the software configuration. The parametering means a defining and establishing of parameters, with whose help the operation of the field device is set to the particular features of the application, for example, the measured medium.

Depending on field device type, a field device can have hundreds of different parameters, which are assigned parameter values at start-up, for example, a linearizing table can be input, which represents a piecewise approximation between the measured physical, measured variable and the measured value output by the field device. Today, the parametering of a field device is performed by means of software tools. The inputting of parameter values is exclusively text based and assumes a technical understanding on the part of the operator.

In the case of a fill level measuring device, the use of a so-called envelope curve module for its start-up is obligatorily. In such case, a graph is used, which displays an above mentioned measurement curve. Such a measurement curve shows, besides the actual reflection signal on the fill substance, however, also disturbance reflections. Frequently, a fill level measuring device is secured on a container in such a manner that the fill level measuring device has a certain separation from the container wall. The measuring signal passes, consequently, first through a certain distance, after which it travels freely radiating in the container. This distance, which is referred to as the block distance, must be taken into consideration for the evaluation of the measurement curve. Also such requires technical understanding on the part of the operator.

SUMMARY

Based on the above, an object of the invention is to provide a method, which enables also technically inexperienced operators to perform a reliable start-up of field devices.

The object is achieved by a method for starting-up by means of a service unit a field device of automation technology mounted on a component, especially a container, at a measuring location, wherein the service unit has a display unit and a camera, comprising:

identifying the field device by means of the service unit;
based on the identifying of the field device, ascertaining parameters of the field device to be set;
registering geometry data of at least a part of the component by means of the camera;
analyzing the registered geometry and, by means of the analyzing of the registered geometry, deriving at least one parameter value for at least one of the parameters to be set;
confirming the calculated parameter value; and
transferring the confirmed parameter value into the field device and storing the parameter value in the field device.

By means of the method of the invention, the operator is supported in simple manner in the start-up of a field device, in that the service unit automatically ascertains parameter values for certain parameters. After identification of the field device, the parameters to be set in the field device are automatically downloaded. For this, there is provided in the service unit a database, which contains the parameters to be set for a plurality of field device types. Alternatively, the service unit is connected by means of an Internet connection with an external database, especially a cloud-capable database, which stores the parameters to be set for a plurality of field device types.

Identification of the field device can occur in different ways. In the simplest case, the operator selects the field device type of the field device from a list, which is displayed on the display unit of the service unit. Then, the parameters to be set are downloaded from the database. Alternatively, identification data are read-out from the field device, especially by means of a radio connection, especially Bluetooth or Wi-Fi, between field device and service unit. Another option is optically identifying the field device. For this, the field device is registered by means of the camera and examined for defined geometries contained in a database. An optical identification of the field device can also include the read-out of an optical code, for example, a barcode or a QR-code, visible on the field device.

Then, the camera of the service unit registers geometry data of the component. For example, the dimensions of the component are registered, in the case of a container, for example, its width, height and depth, and/or when a flowmeter is placed on a pipeline, the tube diameter and/or the inlet- and outlet lengths to/from the flowmeter. The service unit analyzes the registered geometry data and compares these with known geometry data. These known geometry data can likewise be contained in the database. In the course of the comparison, those parameters are determined, for which parameter values can be calculated based on the registered geometry data. The calculating of the parameter values occurs based on one or more algorithms implemented in the service unit. Already known parameter values, which are contained in the database and linked with the known geometry data, can represent starting values/boundary conditions for the calculating. The calculated parameter values are then proposed to the operator.

The operator then checks the proposed parameter values and confirms one or more of the proposed parameter values. In given cases, the operator is provided the opportunity to change proposed parameter values. The confirmed parameter values are then transferred from the service unit into the field device in such a manner that the field device is parametered with the input parameter values.

Field devices, which are mentioned in connection with the method of the invention, have already been named above, by way of example, in the introductory part of the description. The method of the invention is suited for all types of field devices and is not, for instance, limited to fill level measuring devices.

In an advantageous embodiment of the method of the invention, it is provided that a reference geometry is registered by means of the camera, wherein the reference geometry has a defined length in at least one dimension, wherein based on the reference geometry a three-dimensional, polygonal network is created. Known from the literature is the SLAM problem ("Simultaneous Localization and Mapping"), which refers to a problem of robotics, in the case of which a mobile robot must simultaneously create a map of its surroundings and estimate its position within this map. A solution for this problem is the calculating of a three dimensional, polygonal network with the help of a reference geometry.

For this, the camera is either moved around the reference geometry or the angle of sight from the camera onto the reference geometry is slightly varied by means of small movements. Using a stereo camera, this first step can be omitted. Alternatively, a depth camera can be used, which independently executes this step. Then, a three-dimensional image of the geometry is created in the form of a polygonal network. The defined length of at least one of the dimensions of the reference geometry is reported to the service unit, whereby the service unit calculates a defined distance between the meshes of the polygonal network. By supplementing, or increasing, the polygonal network, the spatial size and position of the service unit in the three dimensional space can be determined.

In a preferred further development of the method of the invention, it is provided that the three-dimensional, polygonal network is used, in order to measure the geometry data registered by the camera. Since the service unit knows the mesh size of the three dimensional, polygonal network, any geometries can be registered and measured. This method has a very high accuracy. In connection with the method of the invention, especially the dimensions of the component of the measuring location, or components, which likewise are secured at the measuring location, are measured.

In an advantageous embodiment of the method of the invention, it is provided that for analyzing the registered geometry other geometry data, which supplement the registered geometry data and concern especially parts of the component, which are not registrable by the camera, are taken into consideration. These additional geometry data are registered, or created, for example, in the course of planning the plant, especially the measuring location of the plant. Of concern here are, for example, parts of the component, which are located in the interior of the component and not registrable by an optical camera, which cannot see through the wall of the component. In the case of a container, of concern are, for example, pipes, pipe connections, stirring mechanisms, etc., which are located in the interior of the container. However, also parts of the field device can be of interest.

In a preferred embodiment of the method of the invention, it is provided that the additional geometry data are stored in the field device and are read-out from the field device.

In an alternative preferred embodiment of the method of the invention, it is provided that the additional geometry data are stored in a database, especially a cloud capable database, and are read-out from the database. It can, in such case, be the same database, which is used for identifying the field device, for ascertaining the parameters to be set and/or for comparing the registered geometry data with known geometry data. Alternatively, such is a different, independent database.

In an advantageous embodiment of the method of the invention, it is provided that in the context of analyzing the registered geometry data, or the additional geometry data, a three-dimensional visualization model of at least a part of the component is created. This visualization model represents the component, or the part of the component, in 3D.

An advantageous embodiment of the method of the invention provides that the field of view of the operator is shown on the display unit, and the visualization model is at least partially superimposed on the component on the field of view shown by the display unit. In the case of taking additional geometry data into consideration, more details of the component are evident for the operator, especially relative to the situation inside of the component, then would be observable with the unaided eye.

The display unit of the service unit shows the current field of view of the operator. In the simplest case, the display unit is a combined transparent glass with a projector. The operator views through the glass. The surroundings observed through the glass is referred to as the field of view. The projector is embodied to cast a projection onto the glass, which the operator sees. Then the visualization model is superimposed onto the current field of view of the operator. The visualization model is laid in such a manner over the field of view of the operator that it superimposes on the image on that location, where the component, or the part of the component, is located. If the position of the camera changes relative to the component of the measuring location, then the image shown on the display unit changes accordingly. The visualization model remains, however, at the assigned position of the component and "migrates", or rotates, accordingly, depending on the shifting of the component on the image. It can, moreover, be provided that written materials are added to the geometry data, which are displayed in the visualization model. Such gives, for example, the names of recognized structures and/or the units of length of the registered geometries.

In an advantageous embodiment of the method of the invention, it is provided that the display unit shows as field of view of the operator a continually updated image registered by the camera, and wherein the visualization model is at least partially superimposed on the component of the image shown on the display unit. The display unit of the service unit shows the live image registered by the camera. The operator points the service unit in such a manner at the measuring location that the component of the measuring location is registered by the camera. The visualization model is superimposed on the current live image of the camera. This method is also suited for service units not having a transparent glass, but, instead, a conventional display as display unit.

In an advantageous, further development of the method of the invention, it is provided that a container is used as a component of the measuring location, wherein used as field device is a fill level measuring device, which works according to a contactless measuring method, especially according to the ultrasonic, measuring principle, according to the pulse travel time, measuring principle, or according to the FMCW, measuring principle, in order to determine a fill level of a fill substance in the container. These types of field devices have already been described in the introductory part of the description. Instead of fill level measuring devices, any other type of field devices can be used. The following examples refer, however, to fill level measuring devices and parameters typical for fill level measuring devices. In the case of application of other field device types, these parameters are, in given cases, not present and other parameter types are set.

In a preferred embodiment of the method of the invention, it is provided that parameter values for the parameter to be set relative to a block distance and a linearizing table of the field device are derived from the geometry data. A linearizing table represents a piecewise approximation of the relationship between the physical, measured variable and the measured value output by the field device and is required in almost any field device type, not just in fill level measuring devices. The block distance refers to that distance, which a measuring signal passes through, before it can travel freely radiating into the container. Determining the block distance defines the zero-point on the distance axis of the measurement curve.

In a first variant of the method of the invention, a smart glasses is used as service unit. Such a smart glasses has a screen, which displays the image registered by the camera. For the operator, it appears as if the image registered by the camera is registered by the eyes of the operator. Alternatively, a smart glasses includes a projector, which projects an image on a screen of the eyeglasses. The operator sees the surroundings through the screen of the eyeglasses. At the same time, a camera of the eyeglasses registers the surroundings at the same scale as the eyes of the operator register the surroundings. Instead of projecting the entire image of the surroundings registered by the camera onto the screen, only the visualization model is projected onto the screen. An example of such a smart glasses of the latter type, which is suitable for the method of the invention, is the "HoloLens" of Microsoft.

In a preferred embodiment of the first variant of the method of the invention, it is provided that the method step of confirming the calculated parameter value occurs by means of gesture control. The service unit shows the calculated parameter value as a symbol and superimposes this on the image registered by the camera. The operator points, for example, with its hand at a symbol, or touches the symbol. In such case, the camera registers the position of the hand. By defined movements/gestures with the hand, the parameter value can be confirmed and/or the symbol shifted.

In a second variant of the method of the invention, a mobile end device is used as service unit. Suited for this is, for example, a smart phone or a tablet, or even a laptop, which has a webcam, which enables registering the surroundings in the opposite direction from the operator. The selection of a symbol, the confirming of a parameter value and/or the shifting of a symbol occurs by means of the input means of the mobile end device, for example, by means of contacting the touchscreen, by means of keyboard input and/or by means of input via mouse.

In an advantageous embodiment of the method of the invention, it is provided that the confirmed parameter value is transferred by means of a radio connection, especially Bluetooth, to the field device. Alternatively to Bluetooth, any radio connection can be used, for example, W-Fi or Zigbee. Alternatively, the parameter values can be indirectly transferred into the field device. For this, the parameter values are not sent on direct paths to the field device, but, instead, from the service unit to something other than the field device, for example, to the control station of the plant, to another field device, to another service unit, etc., from where the parameter values are then transferred into the field device.

BRIEF DESCRIPTION OF THE DRAWING

The invention will now be explained in greater detail based on the appended drawing, the sole FIGURE of which shows as follows:

FIG. 1 shows an example of an embodiment of the method of the invention.

DETAILED DESCRIPTION

FIG. 1 shows a measuring location ML of a plant of process automation. The measuring location ML is composed of a container KO, in which a fill substance FL is kept. The fill substance FL is a fluid-like medium or a bulk good. For monitoring the fill level h of the fill substance FL in the container KO, a field device FD in the form of a contactless fill level measuring device is mounted on the container KO. The fill level h of the fill substance FL is measured by the field device, which transmits a measuring signal MS. The measuring signal MS is reflected on the surface of the fill substance FL. The reflected signal RS is received by the field device FD and processed. Based on characteristic variables of the reflected signal RS, for example, based on the duration between the sending of the measuring signal MS and the receiving of the reflected signal RS, the fill level h of the fill substance FL can be determined.

For start-up, the field device FD must be parametered. Conventionally, the parametering, thus the assignment of parameter values for specific parameters, of the field device FD is done text based by means of a service unit SU. For this, however, a thorough technical understanding can be required on the part of the operator OP.

The method of the invention, which will be explained in greater detail below, facilitates the start-up of the field device FD, especially for less experienced users/operators OP.

After mounting the field device FD on the container KO, the operator OP connects with its service unit SU, here in the form of a smart glasses, with the field device FD. The connection occurs wirelessly, for example, via Bluetooth (LE) or W-Fi. Then, the service unit SU reads the identification data of the field device FD and reconciles such with a database. The database is especially accessible via the Internet. To this end, the service unit SU has a mobile radio module, via which the service unit can contact the database. After completed reconciliation, the database transfers to the service unit the parameters to be set for the field device FD.

In a following method step, the operator OP points a camera KA of the service unit SU at the measuring location ML. Based on a reference geometry, which has in at least one dimension a defined length known to the service unit SU and which is mounted, for example, on the field device FD, or is part of the field device FD, the service unit SU defines a three-dimensional, polygonal network. By means of this three dimensional, polygonal network, the camera KA, or the service unit SU, is able to measure objects registered by the camera KA.

In the case of the present method, the camera KA registers the geometry of the container KO of the measuring location ML and measures the geometry of the container KO. For example, the dimensions of the housing of the container are registered. In the present case, the camera KA registers the height H of the container KO as well as the length L of the nozzle, by means of which the field device FD is connected with the container KO.

These registered variables, which are referred to henceforth as geometry data H, L, are compared by the service unit SU with known geometry data, which are stored in the above mentioned database. In the course of the comparison, those parameters of the field device FD are determined, for which parameter values can be calculated based on the registered geometry data H, L. In the present case, these are parameters, which concern the linearizing table of the field device FD, as well as the block distance of the field device FD.

The calculating of the parameter values occurs based on one or more algorithms implemented in the service unit SU. Already known parameter values, which are contained in the database linked with the known geometry data, can be starting values/boundary conditions for the calculating. The calculated parameter values are then proposed to the operator OP.

In the course of ascertaining the parameter values relative to the linearizing, the height H of the container KO is used as geometry data. From the height H, the service unit can determine a minimum value and a maximum value of the fill level of the fill substance FL.

In the course of ascertaining the parameter values relative to the block distance, the length L of the nozzle is used as geometry data. From the length L, the service unit can ascertain the path/distance the measuring signal $SIG_M$ travels, before it can radiate freely in the container KO.

The proposed parameter values are displayed to the operator OP on the display unit DU. The operator OP can, in given cases, modify the calculated parameter values and then perform the confirming. The confirmed parameter values are then transferred from the service unit SU into the field device FD in such a manner that the field device FD is parametered with the input parameter values.

The case can happen that not all relevant geometry data H, L can be registered by the camera KA. In such case, the service unit SU can retrieve other geometry data from the database, data concerning parts of the container, which cannot be seen, for example, parts/components, which are located in the interior of the container KO. In the present case, involved is geometry data of a connection for a pipeline in the interior of the container KO.

These additional geometry data are then used by the service unit to create a three-dimensional visualization model VM of the connection for the pipeline. This visualization model provides a 3D-representation of the connection to the pipeline. The current live image registered by the camera KA is shown on the display unit DU of the service unit. The visualization model VM is integrated in the live image in such a manner that the visualization model is superimposed on the container at the appropriate position on the live image.

For this, the operator OP points the service unit SU in such a manner at the measuring location ML that the container KO is registered by the camera KA. The visualization model VM is superimposed on the current live image of the camera at the location of the connection for the pipeline. The wall of the container KO is, in such case, virtually transparent. Thus, components in the interior of the container are visible for the operator OP. If the position of the camera KA changes relative to the container, then the image shown on the display unit DU changes accordingly. The visualization model VM remains, however, at the assigned position of the container and "travels", or rotates accordingly, depending on the shifting of the container KO in the image.

It can, moreover, be provided to add written materials to the geometry data and to display such in the visualization model VM. These show, for example, the names of recognized structures and/or the length units of the registered geometries.

Also by means of the additional geometry data, parameter values for other parameters can be calculated by means of the service unit SU.

Alternatively to a smart glasses, a mobile end device can also be used as service unit SU. Suited for this is, for example, a smart phone or a tablet, or even a laptop with a webcam. The selection of a symbol, the confirming of a parameter value and/or the shifting of a symbol occurs by means of the input means of the mobile end device, for example, by means of contacting the touchscreen, by means of keyboard input and/or by means of input via mouse.

The method of the invention is suited for all field device types and is not limited, for instance, to fill level measuring devices. The example shown in FIG. 1 relates, however, to fill level measuring devices and presents parameters to be set, which are typical for fill level measuring devices. In the case of application of other field device types, these parameters are, in given cases, not present and other parameter types are set.

LIST OF REFERENCE CHARACTERS

DU display unit
FD field device
FL fill substance
H, L geometry data
KA camera
KO component of a measuring location
ML measuring location
OP operator
SU service unit
$SIG_M$ measuring signal
$SIG_R$ reflected signal
VM visualizing model

The invention claimed is:

1. A method for starting-up a field device of automation technology mounted on a component at a measuring location, the method comprising:
   providing a service unit including a display unit and a camera, wherein smart glasses serve as the service unit;
   identifying the field device using the service unit;
   ascertaining parameters of the field device to be set based on the identifying of the field device;
   registering geometry data of at least a part of the component using the camera;
   analyzing the registered geometry data and deriving at least one parameter value for at least one of the parameters to be set, wherein the deriving of the at least one parameter value is based on the analyzed registered geometry;
   confirming the at least one parameter value; and
   transferring the confirmed at least one parameter value into the field device and storing the confirmed at least one parameter value in the field device.

2. The method as claimed in claim 1, wherein for analyzing the registered geometry, additional geometry data, which supplement the registered geometry data and concern parts of the component which are not registrable by the camera, are taken into consideration.

3. The method as claimed in claim 2, wherein the additional geometry data are stored in the field device and are read-out from the field device.

4. The method as claimed in claim 2, wherein the additional geometry data are stored in a database and are read-out from the database.

5. The method as claimed in claim 2, wherein in the context of analyzing the registered geometry data or the additional geometry data a three-dimensional visualization model of at least a part of the component is created.

6. The method as claimed in claim 5, further comprising:
   showing on the display unit a field of view of the operator; and
   at least partially superimposing the visualization model on the component on the field of view shown by the display unit.

7. The method as claimed in claim 6, wherein the display unit shows as field of view of the operator a continually updated image registered by the camera, and wherein the visualization model is at least partially superimposed on the component of the image shown on the display unit.

8. The method as claimed in claim 1, wherein a container is used as the component of the measuring location, wherein used as field device is a fill level measuring device which works according to a contactless measuring method including an ultrasonic measuring principle, a pulse travel time measuring principle, or an FMCW measuring principle, in order to determine a fill level of a fill substance in the container.

9. The method as claimed in claim 8, wherein parameter values for the parameter to be set relative to a block distance and a linearizing table of the field device are derived from the geometry data.

10. The method as claimed in claim 1, wherein the method step of confirming the at least one parameter value occurs by means of a gesture control.

11. The method as claimed in claim 1, wherein the confirmed at least one parameter value is transferred to the field device by a radio connection.

12. A method for starting-up a field device of automation technology mounted on a component at a measuring location, the method comprising:
- providing a service unit including a display unit and a camera;
- identifying the field device using the service unit;
- ascertaining parameters of the field device to be set based on the identifying of the field device;
- registering geometry data of at least a part of the component using the camera;
- registering a reference geometry using the camera, wherein the reference geometry has a defined length in at least one dimension;
- creating a three-dimensional, polygonal network based on the reference geometry
- analyzing the registered geometry data and deriving at least one parameter value for at least one of the parameters to be set, wherein the deriving of the at least one parameter value is based on the analyzed registered geometry;
- confirming the at least one parameter value; and
- transferring the confirmed at least one parameter value into the field device and storing the confirmed at least one parameter value in the field device.

13. The method as claimed in claim 12, wherein the three-dimensional, polygonal network is used to measure the registered geometry data.

* * * * *